United States Patent [19]

Efkeman et al.

[11] 4,363,967
[45] Dec. 14, 1982

[54] METHOD AND APPARATUS FOR FAR INFRARED DETECTION

[75] Inventors: Edward J. Efkeman, Woodbridge; Elliott Lloyd, Lorton; Howard K. Dickson; James R. Adamson, Jr., both of Alexandria, all of Va.

[73] Assignee: The United States of America as represented by the Secretary of the Army, Washington, D.C.

[21] Appl. No.: 194,656

[22] Filed: Oct. 7, 1980

[51] Int. Cl.³ .............................................. G01J 1/00
[52] U.S. Cl. .................................... 250/339; 250/351
[58] Field of Search .............. 250/330, 332, 334, 338, 250/339, 351, 342; 340/601; 350/1.6; 354/59, 289; 356/437, 438

[56] References Cited

U.S. PATENT DOCUMENTS

| | | | |
|---|---|---|---|
| 3,780,293 | 12/1973 | Flint | 250/351 |
| 3,860,818 | 1/1975 | Stalder et al. | 356/437 |
| 4,230,400 | 10/1980 | Wick et al. | 354/59 |
| 4,280,050 | 7/1981 | Callender et al. | 250/334 |

Primary Examiner—Alfred E. Smith
Assistant Examiner—Janice A. Howell
Attorney, Agent, or Firm—Nathan Edelberg; Milton W. Lee; John E. Holford

[57] ABSTRACT

A modified thermal viewer and method of operating same for detecting and partially analyzing a cloud for the presence of certain chemical compounds, whereby the cloud is viewed through two or more band-pass filters independently and consecutively with each filter responsive to a different band of spectral radiation characteristic of the particular chemical agent of concern.

10 Claims, 4 Drawing Figures

METHOD AND APPARATUS FOR FAR INFRARED DETECTION

The invention described herein may be manufactured, used, and licensed by the U.S. Government for governmental purposes without the payment of any royalties thereon.

BACKGROUND OF THE INVENTION

1. Field of the Invention

The invention relates to thermal viewers or detection devices which operate in the far infrared at a wavelength region around 5 microns and longer.

2. Description of the Prior Art

Current detection devices operating in the far infrared are total radiation detectors which do not discriminate between the frequencies in their band of operation. A step in this direction is described in patent application Ser. No. 130,957, filed Mar. 17, 1980, by Robert E. Callender, et al, now U.S. Pat No. 4,280,050 and having the same assignee as the present application. In this application, a thermal viewer is converted to a radiometer by placing a continuously variable filter in front of the detector and continuously monitoring the output sum of all detector channels. The output is recorded and may be analyzed by persons skilled in the use of this type of information. There is a need, however, for a radiometric device in this spectral region to discriminate between chemical agents present in the atmosphere, which supplies a general go-no-go type information which is easily interpreted by operators who are not skilled in spectral analysis.

SUMMARY OF THE INVENTION

It is a purpose of the present invention, therefore, to provide a simplified radiometer which utilizes a standard thermal viewer with a special filter structure. The only external changes are a single push button switch and a few additional LED indicator lights. By utilizing a simple method of operation, involving these added elements, the operator is capable of quickly making vital decisions regarding the chemical nature of targets within the field of view.

BRIEF DESCRIPTION OF THE DRAWINGS

The invention is best understood with reference to the drawings wherein.

DESCRIPTION OF THE PREFERRED EMBODIMENT

Figure 1:
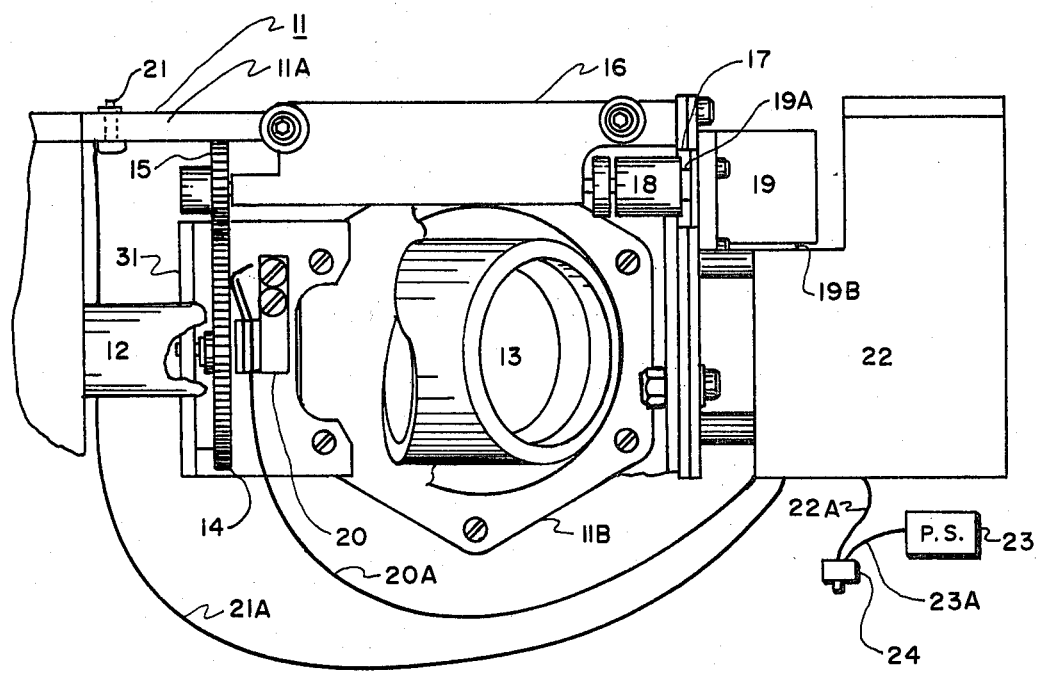
FIG. 1 shows a side sectional view of a far infrared thermal viewer with its objective lens removed, which has been modified to accept a motorized filter wheel.

Referring specifically to FIG. 1, the framework 11 of a FLIR (forward looking infrared) system is shown including support member 11A to which is attached the housing 11B of a thermal imager, e.g. a U.S. Army Model AN/TAS-6, which has been sectioned to show the detector 12. This normally includes a single-diode, a long row of diodes or a two dimensional array of diodes. If one diode is used there will be two scanning mirrors to scan the image in both its dimensions. Usually the detector array is a straight line row of diodes scanned by a single mirror 13 centered on the optical axis, which axis extends from the center of the row and normal thereto. The mirror vibrates about an axis parallel to the row to scan the image formed by an objective lens (not shown). The complete optical axis of the detector and lens includes the optical axis of the array plus an extension thereof from the center of the mirror to the center of the objective lens. The extension usually is orthogonal to the optical axis of the array.

A filter wheel 14 is mounted on the housing so that it intercepts the optical axis nearer its periphery than its center. In FIG. 1 the center and axis of rotation of the wheel is behind the optical axis of the array. It is mounted as close to the detector as feasible to intercept the smallest available cross-section of the image beam. The heel rotates about a first axle through its center which in turn is supported within the housing preferably by a set of ball bearings. The edge of the filter wheel carries a large number of evenly spaced teeth, thereby making it also a gear. A smaller gear 15 with similar teeth engages the edge of the wheel. The smaller gear rotates about a second axle also mounted within an axle housing 16, preferably with a set of ball bearings. The axle housing is mounted in the view housing so that the second axle extends to a drive opening 17 in the wall of the housing where it terminates in an axle coupler 18. A stepping motor 19 is mounted over the drive opening on the outside of the housing and has a shaft which extends into the housing and to mate coaxially with said second axle coupling. The gear ratio between the large and small gear is chosen to match the torque-speed characteristics of the stepping motor. The motor is a Type P54; made by MPC-Products Corp., 7426 N. Linder Ave., Skokie, IL 60076; and was chosen for the present embodiment because it delivers sufficient torque to produce three revolutions of the small gear axle in no more than 90 milliseconds using a 12:1 gear reduction. The parts thus far described within the housing are preferably stainless steel, but some obviously could be made of plastic or other metals, if desired.

Figure 2:
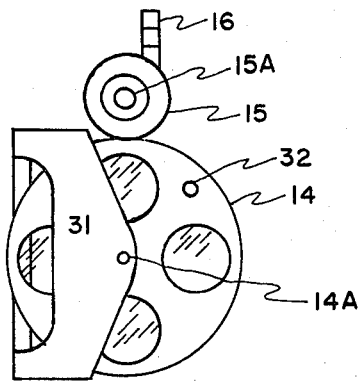
FIG. 2 shows a normal view of the filter wheel and its mounting bracket.

FIG. 2 shows a normal view of the filter wheel 14 and its mounting bracket 31. The ends of the first axle 14A and the second axle 15A are also shown. For test purposes a four-filter wheel was used, but as will be seen, five or more filters with reduction gear ratios directly proportional to the number of filters are highly desirable when the constraints of viewer size will permit. For simplicity, round filters were chosen, each basically consisting of a thin disc of germanium. Other materials transparent to electromagnetic radiation in the far infrared, i.e. 5.6 microns and longer wavelengths, may also be used. To form each filter, an interference layer of a second material of a specific thickness, such as a quarter wavelength of a pass-band frequency, is coated thereon. This can be followed by a similar coating of germanium and/or a third material to obtain narrow pass bands and/or steep filter skirts. Suitable filters of this type are commercially available from the Optical Coating Laboratory, Inc. Technical Products Division, P. O. Box 1599, 2789 Griffen Ave., Santa Rosa, CA 95403. One dummy filter is desirable to permit normal viewing and this, therefore, passes the entire band to which the viewer is sensitive. The dummy filter may receive only an antireflection and/or protective coating of silicon monoxide or the like. Actually this dummy filter produces a very slight degradation of the image when the viewer is operated in its normal broadband manner. It is necessary, however, because the introduction of any of the filters slightly defocuses the image. The image is then refocussed by adjusting the elements of the objective lens and/or shimming the detector to a new position. If the broadband filter is then omitted the image would again be defocussed. The filter wheel also carries a Telfon indexing button 32 pressed into an opening near the periphery thereof and preferably bonded in place.

Returning to FIG. 1, the viewer housing supports a first switch 20 having a pair of normally open contact fingers which are pressed together by the passage of the button 32 as the filter wheel turns. The button is located in an angular position such that the broadband filter is centered on the optical axis as the contact fingers are closed. A second pushbutton switch 21 is mounted at any convenient point on the outside of the viewer housing. The second switch is preferably a pushbutton single pole double throw type spring loaded to return to its initial position after being released momentary. Both switches 20 are wired through cables 20A and 21A to an electronics module 22 which in turn is wired through a third external on-off switch 22 to the power supply 23 of the viewer and directly to the field windings of the stepping motor through leads 19B, 22A and 23A.

Figure 3:
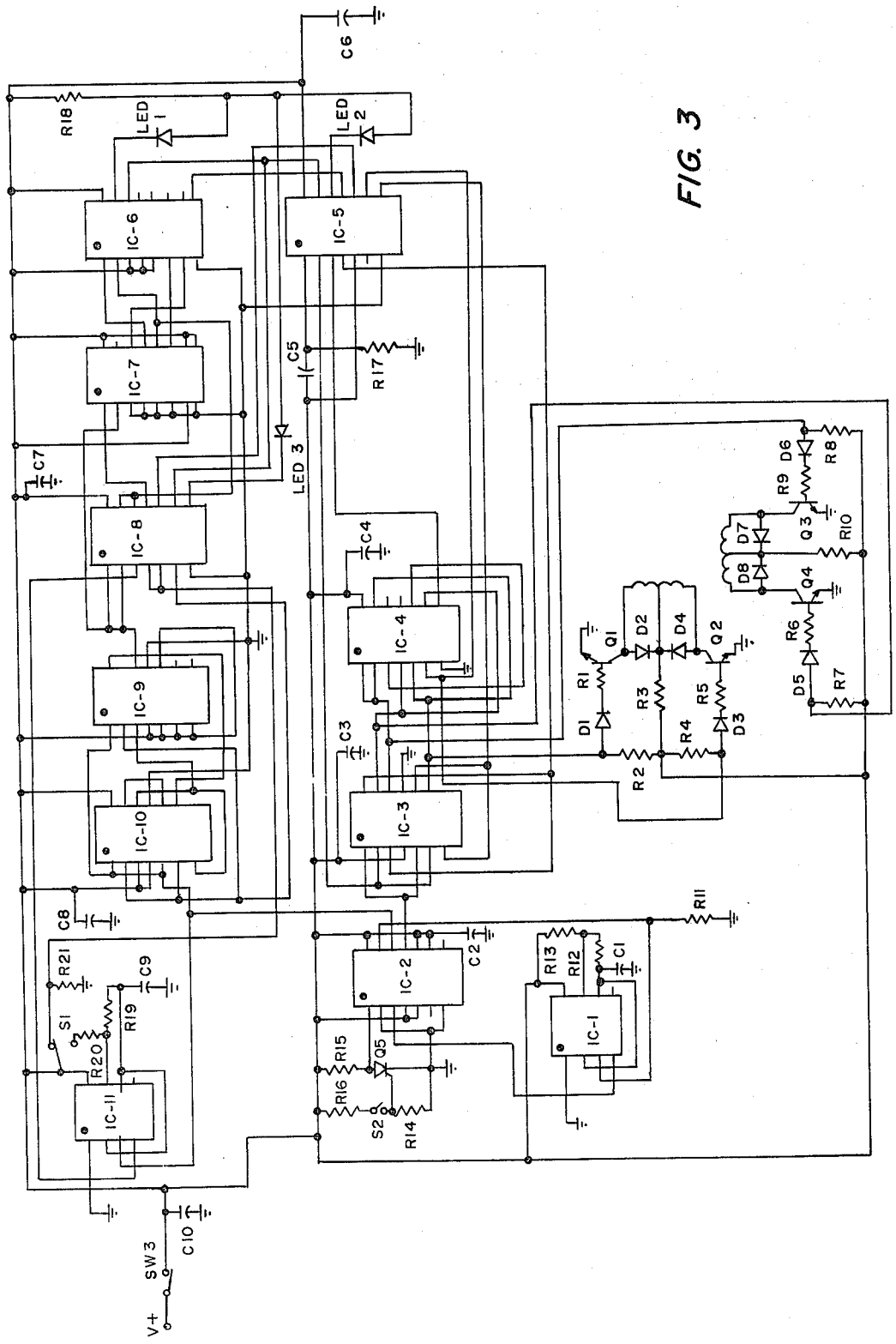
FIG. 3 shows a circuit diagram of the electronic logic circuit of FIG. 1.

The circuit diagram for the electronics module is shown in FIG. 3. A description of the circuit elements is found in Table I. The stepping motor has a permanently polarized armature with four othogonally related windings which must be pulsed in a specific sequence indicated thereon to rotate the armature in a given direction. The current to each winding, respectively, is controlled by one of the four stepping motor transistors $Q_1$-$Q_4$ in their numbered order. When the on-off switch 53 (22 of FIG. 1) is energized IC-1 slowly generates a series of pulses that drive circuits IC-2, IC-3, IC-4 and IC-5 thereby energizing the stepping motor transistors in proper sequence causing the filter wheel to run until the indexing switch 52 (20 in FIG. 1) closes. When switch S1 (21 in FIG. 1) is energized IC-11 sends clock pulses through IC-10, IC-9 and IC-8 which momentarily disable IC-11 until S1 is released and then detect the required number of pulses to turn the filter wheel to a specific filter, e.g. count 1 for filter 1, count 2 for filter 2, etc. IC-7, IC-6 and IC-5 monitor the number of pulses generated and energize the LEDs in proper sequence corresponding to the filter wheel location. The same clock pulses that are generated when S1 is energized also go to IC-2 which drives IC-3, IC-4 and IC-5. This action energizes the proper motor transistors ($Q_1$-$Q_4$) causing the filter wheel to move to the desired location. The connections shown in FIG. 3 light LED 1 at count 1, both LED 1 and 2 at count 2 and LEDs 1, 2 and 3 at count 3. Count 4 corresponding to the broadband filter resets the counter to zero and extinguishes all LEDs as also does the on-off switch when turned to the off position and on again. The LEDs are mounted at a convenient location on the receiver housing in the field of view of the user.

To use the above described apparatus the operator must first select a background source of radiation which has a substantially uniform radiation pattern over the entire band of operation of the viewer like an empty portion of the sky. He then positions and focuses the viewer so that the portion of the gas cloud under observation is between the viewer and the radiation source or empty portion of the sky. He then turns on the viewer which automatically resumes normal viewing and focuses on the cloud. He then momentarily closes the filter switch 21 and views the cloud for at least a second to allow his eye to accommodate to the reduced level of illumination. He then momentarily closes the filter switch 21 a second time and observes whether or not a change in brightness occurs and records this as a first result (or commits it to memory). He then momentarily closes the filter switch again and records whether or not there is a change as a second result, and so forth until he obtains sufficient results or returns to the broadband normal viewing filter, which result is not recorded, obviously. Based on the above results certain rather obvious decisions can be made, with respect to the gas cloud, as to its possible effects on humans, animals, plants and equipment and no effort will be made to enumerate these in this application.

Figure 4:
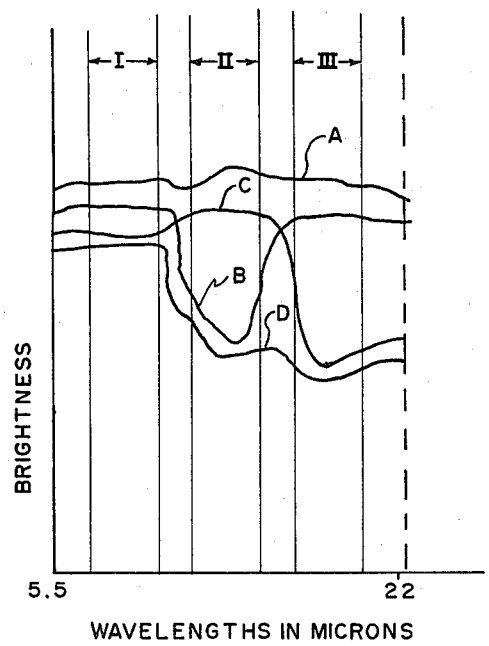
FIG. 4 shows a graph of the far infrared spectral transmittance of four idealized clouds having different chemical structures superimposed on one possible combination of the pass-bands for the elemental filters in FIG. 2.

To better understand the interpretation of such results, reference is made to FIG. 4 which shows a graph of the possible spectral characteristics of four different idealized gas clouds designated A, B, C & D and supposedly formed by different chemical agents viewed against a clear sky background. Also shown on the graph are three representative passbands of filters 1, 2, and 3 of the present invention. Cloud A passes all frequencies within the narrow filter bands with little difference and an observer will recognize this by the fact that no change in brightness occurs as filters 2 and 3 are substituted for filter 1. Cloud B, however, will exhibit a change in brightness as filter 2 replaces filter 1 and a second change as filter 3 replaces filter 2. Cloud C exhibits no change between filters 1 and 2 and a distinct change between filters 2 and 3. Finally, Cloud D exhibits a change between filters 1 and 2, but no change between filters 2 and 3. Thus, if it were assumed that A, B, C, and D are the only clouds likely to occur the likelihood of the presence of specific ones of these can be greatly enhanced by knowing the above changes in brightness, particulary if only one is actually present. The results can be arranged in a standard $2 \times 2$ truth table, if desired, as a training aid until the user becomes familiar with them.

If the observer also notes the direction of the brightness changes, three additional pieces of information are available. Whether these can be used to identify additional types of gas depends on the specific absorption peaks invlolved. Obviously more filters will provide more information, but under some circumstances only two filters can spot a single absorption band which may be sufficient for certain decisions. In some cases the narrow band filters might be required to pass mutually exclusive frequencies only but usually some overlapping is permissible.

Instead of merely distinguishing one particular gas from another, a better use of the present invention is to distinguish one class of gases from another. Of particular interest is a class known as nerve gases. A common ingredient of such gases, dimethyl methylphosphonate (DMMP), has an absorption band between 9.6 and 10.5 microns. It would be helpful to distinguish these poisonous gases from a second poisonous class which has an absorption band between 8.4 and 9.6 microns, a third poisonous class with an absorption peak between 11 and 22 microns, and a non-poisonous camouflage gas having no absorption bands in the far infrared but normally provides the same appearance when dispersed in a battlefield situation. The four are easily distinguished when the three filters have pass bands in the above spectral regions.

Many variations of the above methods and apparatus will be immediately apparent to those skilled in the art, but the invention is to be limited only by the claims which follows.

TABLE I
(See FIG. 3)

| | |
|---|---|
| *R1-360 | ***C1-0.68μf |
| R2-360 | C2-0.01μf |
| R3-10(¼ W) | C3-0.01μf |
| R4-360 | C4-0.01μf |
| R5-360 | C5-0.1μf |
| R6-360 | C6-0.01μf |
| R7-360 | C1-0.01μf |
| R8-360 | C8-0.01μf |
| R9-360 | C9-1.0μf |
| R10-10(¼ W) | C10-10μf |
| R11-130 | D1-1N914 |
| R12-390K | D2-A14F |
| R13-56K | D3-1N914 |
| R14-1K | D4-A14F |
| R15-100 | D5-1N914 |
| R16-5.5K | D6-1N914 |
| R17-100 | D7-A14F |
| R18-100 | D8-A14F |
| R19-250K | Q1-2N2270 |
| R20-1K | Q2-2N2270 |
| R21-130 | Q3-2N2270 |
| | Q4-2N2270 |
| S-1-SPDT(Momentary) | Q5-2N5060 |
| S-2-SPST(Cam-Oper.) | |
| S-3-SPST Toggle | |
| **IC-1 555(Timer) | |
| 2 5486(4-Excl.-OR) | |
| 3 5473(Flip-Flop) | |
| 4 5451(4-AND) | |
| 5 5404(Hex Invert) | |
| 6 5448(Decoder) | |
| 7 54161(Counter) | |
| 8 5400(4-HAND) | |
| 9 5473(Flip-Flop) | |
| 10 5473(Flip-Flop) | |
| 11 555(Timer) | |

*Note - All resistors ¼W unless otherwise specified.
**Dot on IC indicates Pin No. 1. Pins numbered counterclockwise
***All capacitors have working voltages of 25V

We claim:

1. In combination with a thermal viewer with an objective lens and a far infrared detector sensitive to a broad band of infrared frequencies, a subsystem for distinguishing one cloud of a first gaseous compound from an alternative cloud formed from a second gaseous compound when backlighted by a substantially uniform spectral distribution of light in the far infrared, comprising:
    a filter wheel mounted in said viewer between said objective lens and said detector having at least three apertures therein;
    one of said apertures being arranged to pass all far infrared frequencies in said broad band;
    each remaining aperture containing a filter which transmits only one of a group of different narrow bands of frequencies; and
    a stepping motor means mounted on said viewer to move said filter wheel so that said apertures are sequentially centered on the optical axis of said lens, the stepping period of said motor means being less than one tenth of a second.

2. An apparatus according to claim 1 wherein said wheel contains 4 apertures.

3. An apparatus according to claim 1 wherein said wheel contains 6 apertures.

4. An apparatus according to claim 2 wherein said narrow bands include the following wavelengths:
    9.6 to 10.5 microns, 8.4 to 9.6 microns, and 11–22 microns.

5. An apparatus according to claim 1 wherein:
    said filters consist of equal thickness plates of a material transparent to far infrared with at least one interference coating thereon.

6. An apparatus according to claim 1 wherein:
    said motor includes a rotating shaft geared to said wheel to produce a large rotation reduction ratio therebetween; and
    an electronic logic module means to pulse said motor through several rotations in less than one tenth of a second.

7. An apparatus according to claim 6 further including:
    a LED for each of said narrow band filters coupled to said logic circuit; and
    said logic module means includes circuit means to energize a different LED as its filter centers on said optical axis.

8. The method of distinguishing one cloud of gas having a first chmeical structure from a second cloud of gas having a different chemical structure, comprising the steps of:
    viewing a portion of said one cloud for at least one second against a background of substantially uniform spectral radiation in the range of 5.6 to 22 microns with a thermal viewer having a substantially uniform response over said range and a first filter rejecting all but a narrow band of radiation within said range; and
    substituting a second filter with a different pass band for said first filter in less than one tenth of a second.

9. The method according to claim 8 further including the steps of:
    viewing through said second filter at least one second; and
    substituting a third filter with a pass band different from said first and second filters for said second filter in less than one tenth of a second.

10. The method of claim 9 further including the steps of:
    recording each substitution and any significant change in brightness associated therewith to obtain a truth table.

* * * * *